(12) United States Patent
Depta et al.

(10) Patent No.: US 12,467,603 B2
(45) Date of Patent: Nov. 11, 2025

(54) OPTICS SUPPORT SYSTEM FOR AN AIRCRAFT LIGHT, AIRCRAFT LIGHT COMPRISING OPTICS SUPPORT SYSTEM, AND AIRCRAFT COMPRISING THE SAME

(71) Applicant: Goodrich Lighting Systems GmbH & Co. KG, Lippstadt (DE)

(72) Inventors: Marion Depta, Lippstadt (DE); Anil Kumar Jha, Lippstadt (DE); Elmar Schrewe, Anröchte (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/897,700

(22) Filed: Sep. 26, 2024

(65) Prior Publication Data

US 2025/0122993 A1    Apr. 17, 2025

(30) Foreign Application Priority Data

Oct. 17, 2023 (EP) .................................... 23204181

(51) Int. Cl.
| | |
|---|---|
| *F21V 17/02* | (2006.01) |
| *B64D 47/02* | (2006.01) |
| *F21V 7/06* | (2006.01) |
| *F21W 107/30* | (2018.01) |
| *F21Y 115/10* | (2016.01) |

(52) U.S. Cl.
CPC .............. *F21V 17/02* (2013.01); *B64D 47/02* (2013.01); *F21V 7/06* (2013.01); *F21W 2107/30* (2018.01); *F21Y 2115/10* (2016.08)

(58) Field of Classification Search
CPC ........... F21V 17/02; F21V 7/06; B64D 47/02; F21W 2107/30; F21Y 2115/10
See application file for complete search history.

(56) References Cited

U.S. PATENT DOCUMENTS

| | | |
|---|---|---|
| 7,222,995 B1 | 5/2007 | Bayat et al. |
| 9,772,083 B2 | 9/2017 | Jha et al. |
| 10,989,382 B2 | 4/2021 | Jha et al. |

(Continued)

FOREIGN PATENT DOCUMENTS

| | | |
|---|---|---|
| DE | 102012107834 | 2/2014 |
| EP | 4230530 | 8/2023 |

OTHER PUBLICATIONS

European Patent Office; European Search Report dated Mar. 5, 2024 in EP Serial No. 23204181.4.

*Primary Examiner* — Evan P Dzierzynski
(74) *Attorney, Agent, or Firm* — SNELL & WILMER L.L.P.

(57) ABSTRACT

An optics support system for an aircraft light comprises: a multi-layer support board, having a main plane of extension; an LED arranged on the multi-layer support board; a first set of leg stands, positioned around the LED, wherein the first set of leg stands provides first abutment surfaces for arranging an optical element, having a corresponding set of legs, over the LED in a first orientation; and a second set of leg stands, positioned around the LED. The second set of leg stands provides second abutment surfaces for arranging the optical element over the LED in a second orientation; and the first abutment surfaces and the second abutment surfaces are at different heights in a z-dimension of the multi-layer support board, orthogonal to the main plane of extension.

14 Claims, 7 Drawing Sheets

(56) References Cited

U.S. PATENT DOCUMENTS

| | | | |
|---|---|---|---|
| 11,009,214 B2 | 5/2021 | Broughton | |
| 2011/0273892 A1* | 11/2011 | Mostoller | F21V 17/06 |
| | | | 362/433 |
| 2016/0362043 A1* | 12/2016 | Debert | B60Q 1/44 |
| 2017/0370550 A1 | 12/2017 | Japs et al. | |
| 2019/0016473 A1* | 1/2019 | Depta | F21V 5/045 |
| 2020/0363031 A1* | 11/2020 | Jha | F21V 17/105 |
| 2021/0222851 A1 | 7/2021 | Pirringer | |
| 2023/0151943 A1 | 5/2023 | Jha et al. | |
| 2023/0265996 A1* | 8/2023 | Ebbers | F21V 17/10 |
| | | | 362/470 |

\* cited by examiner

OPTICS SUPPORT SYSTEM FOR AN AIRCRAFT LIGHT, AIRCRAFT LIGHT COMPRISING OPTICS SUPPORT SYSTEM, AND AIRCRAFT COMPRISING THE SAME

CROSS-REFERENCE TO RELATED APPLICATIONS

This application claims priority to EP patent application Ser. No. 23204181.4, filed Oct. 17, 2023 and titled "OPTICS SUPPORT SYSTEM FOR AN AIRCRAFT LIGHT, AIRCRAFT LIGHT COMPRISING OPTICS SUPPORT SYSTEM, AND AIRCRAFT COMPRISING THE SAME," which is incorporated by reference herein in its entirety for all purposes.

FIELD

The present invention is in the field of aircraft lighting. In particular, the present invention is in the field of optics support systems for aircraft lights, aircraft lights comprising such optics support systems, and aircraft equipped with such aircraft lights. The present invention further relates to assembling aircraft lights.

BACKGROUND

Modern aircraft, such as large commercial passenger airplanes, have a vast range of aircraft lights. On the one hand, a variety of exterior aircraft lights, such as headlights, navigation lights, anti-collision lights, wing/engine scan lights, etc. are typically provided. On the other hand, a variety of interior aircraft lights, such as cabin illumination lights, reading lights, exit sign lights, etc. are also typically provided. Modern commercial passenger airplanes have a very large number of aircraft lights.

Aircraft lights typically comprise at least one light source, in particular at least one LED, and at least one optical element, such as at least one lens or reflector, for forming a light output of the aircraft light from the light emitted by the light source(s). In order to provide the desired light output, the optical element(s) need(s) to be aligned with the light source(s).

The production of many aircraft lights takes place over long periods of time, often times multiple decades. The reason is that aircraft generally have very long product cycles and that the introduction of new aircraft lights often requires time-consuming and cumbersome certification processes. During such long product cycles, it is possible that a particular light source/a particular LED, which is part of the certified aircraft light, is no longer available. This is referred to as light source obsolescence/LED obsolescence. It is also possible that it is desirable during such a long product cycle to switch to newly developed, more efficient light sources/LEDs. In the case of a change in the light source/LED, the design of the whole aircraft light often needs to be adapted, because one or more optical elements need to be realigned in correspondence with the new light source, in order to provide the desired light output.

Accordingly, it would be beneficial to provide an optics support system for supporting an optical element of an aircraft light, wherein the optics support system allows for conveniently adjusting the position of the optical element in accordance with the characteristics of an LED of the aircraft light.

SUMMARY

Exemplary embodiments of the invention include an optics support system for an aircraft light, with the optics support system comprising a multi-layer support board, having a main plane of extension, which may also be referred to as an x-y-plane, and an LED, arranged on the multi-layer support board. The optics support system further comprises a first set of leg stands, positioned around the LED, and a second set of leg stands, also positioned around the LED. The first set of leg stands provides first abutment surfaces for arranging an optical element, having a corresponding set of legs, over the LED in a first orientation. The second set of leg stands provides second abutment surfaces for arranging the optical element over the LED in a second orientation. The first abutment surfaces and the second abutment surfaces are at different heights in a z-dimension of the multi-layer support board, with the z-dimension being oriented orthogonal to the main plane of extension.

Exemplary embodiments of the invention further include a method of assembling an aircraft light, wherein the method comprises: providing a multi-layer support board, having a main plane of extension, wherein the multi-layer support board has a first set of leg stands, positioned around an LED location, and a second set of leg stands, positioned around the LED location, wherein the first set of leg stands provides first abutment surfaces and wherein the second set of leg stands provides second abutment surfaces, wherein the first abutment surfaces and the second abutment surfaces are at different heights in a z-dimension of the multi-layer support board, orthogonal to the main plane of extension; placing an LED on the LED location, the LED being of a particular LED type with a particular LED chip height in the z-dimension; depending on the particular LED type of the LED, selecting one of the first set of leg stands and the second set of leg stands; placing an optical element, having a set of legs, over the LED, with the set of legs being placed on the abutment surfaces of the selected one of the first set of leg stands and the second set of leg stands.

By choosing one of the sets of abutment surfaces from the two of sets of abutment surfaces and placing the legs of the optical element on the selected set of abutment surfaces, the optical element may be arranged in different heights above the multi-layer support board and in different heights above the LED, without replacing or modifying the optical element and/or the multi-layer support board. As a result, the position of the optical element with respect to the multi-layer support board and the LED may be conveniently adjusted to different types of LEDs, in particular to LEDs having different heights/different chip heights. It may be possible to provide an optimized light output independently of the height/chip height of the LED.

An optics support system for an aircraft light according to an exemplary embodiment of the invention may be employed in combination with different LEDs. In particular, it is possible that the optics support system does not need to be redesigned for being combined with different types of LEDs, in particular with different types of LEDs having different heights/chip heights.

In consequence, an aircraft light comprising an optics support system according to an exemplary embodiment of the invention may be flexibly equipped with different types of LEDs, without redesigning the aircraft light. As a result, an aircraft light comprising an optics support system according to an exemplary embodiment of the invention may be produced in large numbers and over a long period of time, even if the type of the LED, which is employed in the aircraft light, changes over time. The re-certification efforts for the aircraft light may be kept low over time.

In an embodiment, the first abutment surfaces of the first set of leg stands have a common first height, and the second abutment surfaces of the second set of leg stands have a common second height, which differs from the first height. Such a configuration, in which the abutment surfaces of each set have the same height, is comparably easy to produce, and the optical element may be placed on the abutment surfaces in a comparably easy manner.

In an embodiment, the first abutment surfaces of the first set of leg stands have different heights in the z-dimension, and the second abutment surfaces of the second set of leg stands also have different heights in the z-dimension. In such a configuration, each one of the first abutment surfaces corresponds to a particular one of the second abutment surfaces, forming a pair of abutment surfaces, wherein the difference between the heights of the two abutment surfaces of each pair are the same. In other words, all first abutment surfaces of the first set of leg stands are height-shifted by the same amount for forming the second abutment surfaces of the second set of leg stands.

In such an embodiment, the legs of the optical element, which are to be placed onto the abutment surfaces, may have different lengths for compensating for the different heights of the abutment surfaces of each set of leg stands.

In an embodiment, the first set of leg stands and the second set of leg stands are positioned on a circular contour around the LED. Such a configuration may in particular be beneficial in a situation in which the optical element has a rotational symmetry with respect to a central axis, which is oriented perpendicular to the main plane of extension of the multi-layer support board. In the case of such rotational symmetry, the legs of the optical element may be selectively arranged on the first set of leg stands or on the second set of leg stands, without changing the optical properties of the optical element.

In an embodiment, the first set of leg stands and the second set of leg stands are mirror symmetrical with respect to a line extending through the LED in the main plane of extension of the multi-layer support board. Such a configuration may in particular be beneficial in a situation in which the optical element is mirror symmetrical with respect to a plane of symmetry running through the LED and being orthogonal to the main plane of extension of the multi-layer support board, allowing the legs of the optical element to be selectively arranged on the first set of leg stands or on the second set of leg stands, without changing the optical properties of the optical element. It is in particular possible in such a set-up to provide a mirror symmetrical optical element whose legs have different distances from the LED. This degree of freedom in spacing the legs may be helpful in achieving a particularly compact aircraft light design and/or in meeting other design goals.

In an embodiment, the first set of leg stands and the second set of leg stands allow for the optical element to be arranged in a first orientation and in a second orientation, wherein the first and second orientations differ with respect to their rotation around a central axis extending through the LED. Such a set-up may allow the second orientation to be reached from the first orientation by rotation of the optical element around the central axis.

In an embodiment, said central axis extends in the z-dimension, which is oriented perpendicular to the main plane of extension of the support board, which may also be referred to as the x-y-plane.

Such a configuration may in particular be beneficial in a configuration, in which the optical element has a rotational symmetry and in which the legs of the optical element may be selectively arranged on the first set of leg stands or on the second set of leg stands, without changing the optical properties of the optical element.

In an embodiment, each of the first set of leg stands and the second set of leg stands consists of three leg stands for accommodating three legs of the optical element. With three legs, which are accommodated in three corresponding leg stands, an unambiguous definition of the position and orientation of the optical element with respect to the support board may be achieved.

In an embodiment, each of the first set of leg stands and the second set of leg stands comprises more than three leg stands, for example, four or five leg stands, for accommodating more than three, in particular four or five, legs of the optical element. Using more than three legs may provide additional support for the optical element. It may further reduce the weight, which is to be supported by each of the legs.

In an embodiment, each of the first set of leg stands and the second set of legs stands is provided on a respective one of the following components of the multi-layer support board: a support board core layer, such as an FR4 layer, a conductive layer, such as a copper layer, a solder mask layer, a silk screen, and a surface mounted device structure, which may also be referred to as an SMD structure. A conductive layer, such as a copper layer, may be employed for supplying electric energy to the LED for operating the LED.

In an embodiment, the multi-layer support board may comprise all of the core layer, the conductive layer, the solder mask layer, the silk screen, and the surface mounted device(s).

In an alternative embodiment, the support board may comprise only a subset of the core layer, the conductive layer, the solder mask layer, the silk screen, and the surface mounted device(s).

In an embodiment, there may be multiple solder mask layers. The solder mask layers may, for example, include a first solder mask layer, which may be a photosensitive solder mask layer, and a second solder mask layer, which may provide UV protection.

In an embodiment, the first abutment surfaces and the second abutment surfaces differ in height along the z-dimension of the multi-layer support board by a height difference of between 0.1 mm and 1 mm, in particular by a height difference of between 0.15 mm and 0.3 mm. Such height differences have been found as well suited for compensating for typical variations of the dimensions, in particular for varying heights/chip heights, of different types of LEDs, which may be employed as light sources of the aircraft light.

In an embodiment, the optics support system further comprises a third set of leg stands, which are positioned around the LED, wherein the third set of leg stands provides third abutment surfaces for arranging the optical element over the LED in a third orientation, and wherein the first abutment surfaces and the second abutment surfaces and the third abutment surfaces are at different heights in the z-dimension of the multi-layer support board.

Providing a third set of leg stands with third abutment surfaces, which are arranged at different heights than the first and second abutment surfaces, may allow for an increased freedom in varying the height of the optical element with respect to the support board and the LED. In consequence, providing a third set of leg stands may allow for combining the support board and the optical element with an even larger number of different LED types.

In an embodiment, the first set of leg stands, the second set of leg stands and the third set of leg stands are arranged in a configuration which allows for the optical element to be arranged in first, second, and third orientations, which differ with respect to their rotation around a central axis extending through the LED.

The first set of leg stands, the second set of leg stands and the third set of leg stands may in particular be positioned on a circular contour around the LED.

Such a configuration may in particular be beneficial in a configuration, in which the optical element has a rotational symmetry, allowing the legs of the optical element to be selectively arranged on the first set of leg stands, on the second set of leg stands, and on the third set of leg stands, without changing the optical properties of the optical element.

In an embodiment, each of the first set of leg stands, the second set of legs stands and the third set of leg stands is provided on a respective one of the following components of the multi-layer support board: a support board core layer, such as an FR4 layer, a conductive layer, such as a copper layer, a solder mask layer, a silk screen, and a surface mounted device structure, which may also be referred to as an SMD structure.

The first set of leg stands, the second set of leg stands, and the third set of leg stands may in particular be provided on the support board core layer, on the conductive layer, and on the solder mask layer, respectively.

In an embodiment, the heights along the z-dimension of the multi-layer support board between the first abutment surfaces and the third abutment surfaces and/or the between the second abutment surfaces and the third abutment surfaces differ by between 0.1 mm and 1 mm, in particular by between 0.15 mm and 0.3 mm. Such differences in height have been found as well suited for compensating for varying dimensions, in particular for varying heights/chip heights, of different types of LEDs, which may be employed as light sources of the aircraft light.

In an embodiment, each of the first set of leg stands, the second set of leg stands and the third set of leg stands consists of three leg stands for accommodating three legs of the optical element. With three legs, which are accommodated in three corresponding leg stands, an unambiguous definition of the position and orientation of the optical element with respect to the support board may be achieved.

In an embodiment, each of the first set of the first set of leg stands, the second set of leg stands and the third set of leg stands consists of more than three leg stands, for example of four or five leg stands, for accommodating more than three, in particular four or five, legs of the optical element. Using more than three legs may provide additional support for the optical element. It may further reduce the weight, which is to be supported by each of the legs.

Exemplary embodiments of the invention further include an aircraft light, comprising an optics support system according to an exemplary embodiment of the invention and an optical element, which is arranged over the LED. The optical element may have a set of legs, which are in engagement with a particular one of the first set of leg stands and the second set of leg stands of the optics support system. The additional features, modifications and effects, described above with respect to the optics support system and/or with respect to the method of assembling an aircraft light, apply to the aircraft light in an analogous manner.

In an embodiment, the optics support system comprises three sets of leg stands and the set of legs of the optical element is in engagement with a particular one of the first set of leg stands, the second set of leg stands and the third set of leg stands of the optics support system.

In an embodiment, the optical element comprises a reflector, in particular a collimating reflector.

In an embodiment, the optical element comprises a lens, in particular a collimating lens.

In an embodiment, the optical element comprises a reflector lens combination, in particular a collimating reflector lens combination.

In an embodiment, the optical element is a substantially rotationally symmetric optical element. The optical element may have a rotational symmetry with respect to an axis of rotation.

In an embodiment, the aircraft light is an exterior aircraft light. The aircraft light may in particular be a red-flashing anti-collision beacon light, a white anti-collision strobe light, a landing light, a take-off light, a taxi light, a runway turn-off light, a navigation light, a logo light, a wing scan light, an engine scan light, a cargo loading light, or a multi-functional exterior aircraft light, which combines the functionalities of at least two of a red-flashing anti-collision beacon light, a white anti-collision strobe light, a landing light, a take-off light, a taxi light, a runway turn-off light, a navigation light, a logo light, a wing scan light, an engine scan light, and a cargo loading light.

In an embodiment, the aircraft light is an interior aircraft light. The aircraft light may in particular be a passenger reading light, a cabin illumination light, a washroom illumination light, a signal light, an emergency light, or an exit light.

Exemplary embodiments of the invention further include an aircraft, such as an airplane or a helicopter, which is equipped with at least one aircraft light according to an exemplary embodiment of the invention. The additional features, modifications and effects, as described above with respect to the optics support system and/or with respect to the aircraft light and/or with respect to the method of assembling an aircraft light, apply to the aircraft in an analogous manner.

BRIEF DESCRIPTION OF THE DRAWINGS

Further exemplary embodiments of the invention are described below with respect to the accompanying drawings, wherein.

DETAILED DESCRIPTION

Figure 1A:
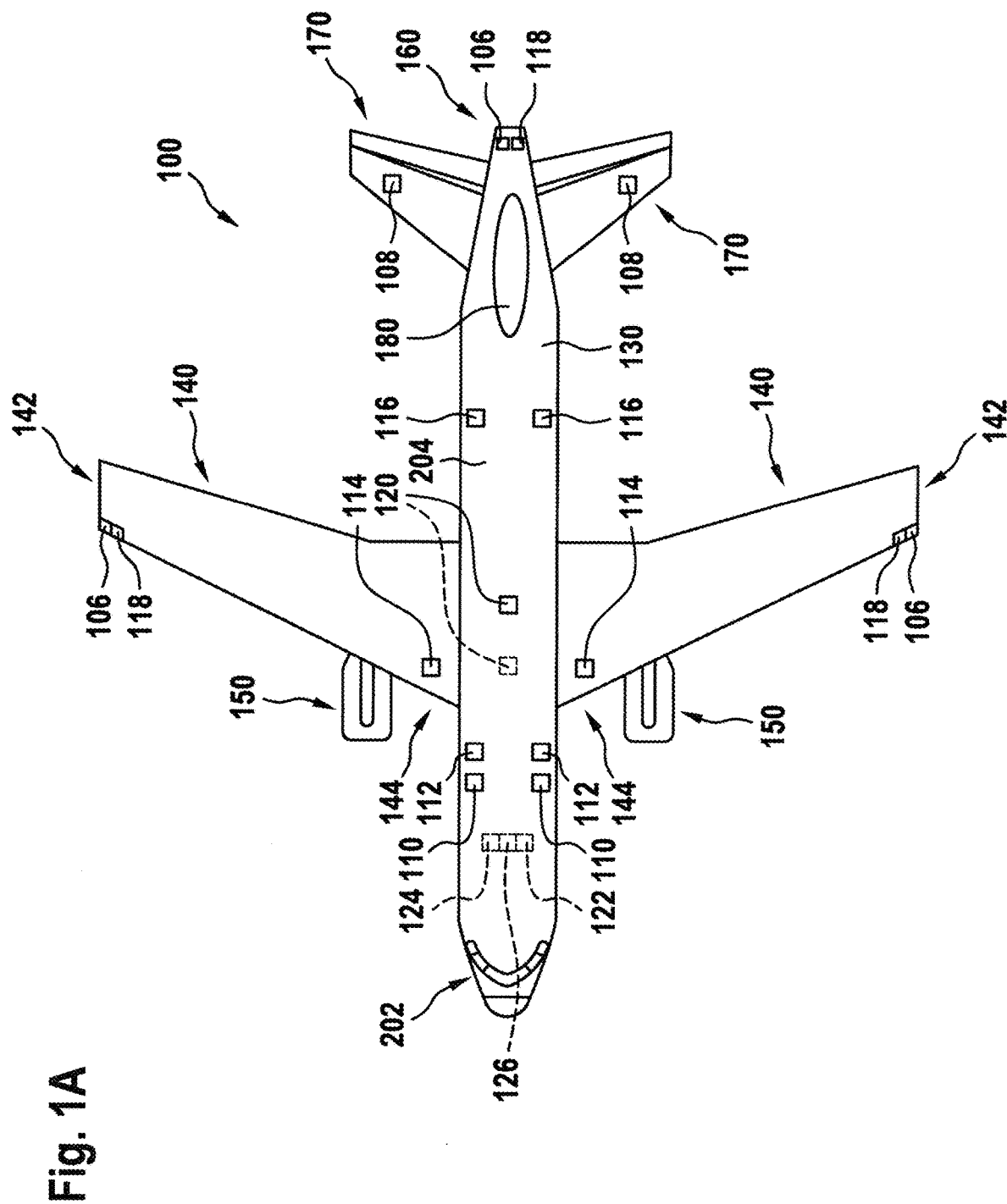
FIG. 1A shows a schematic top view of an aircraft, which is equipped with a variety of exterior aircraft lights.
Figure 1B:
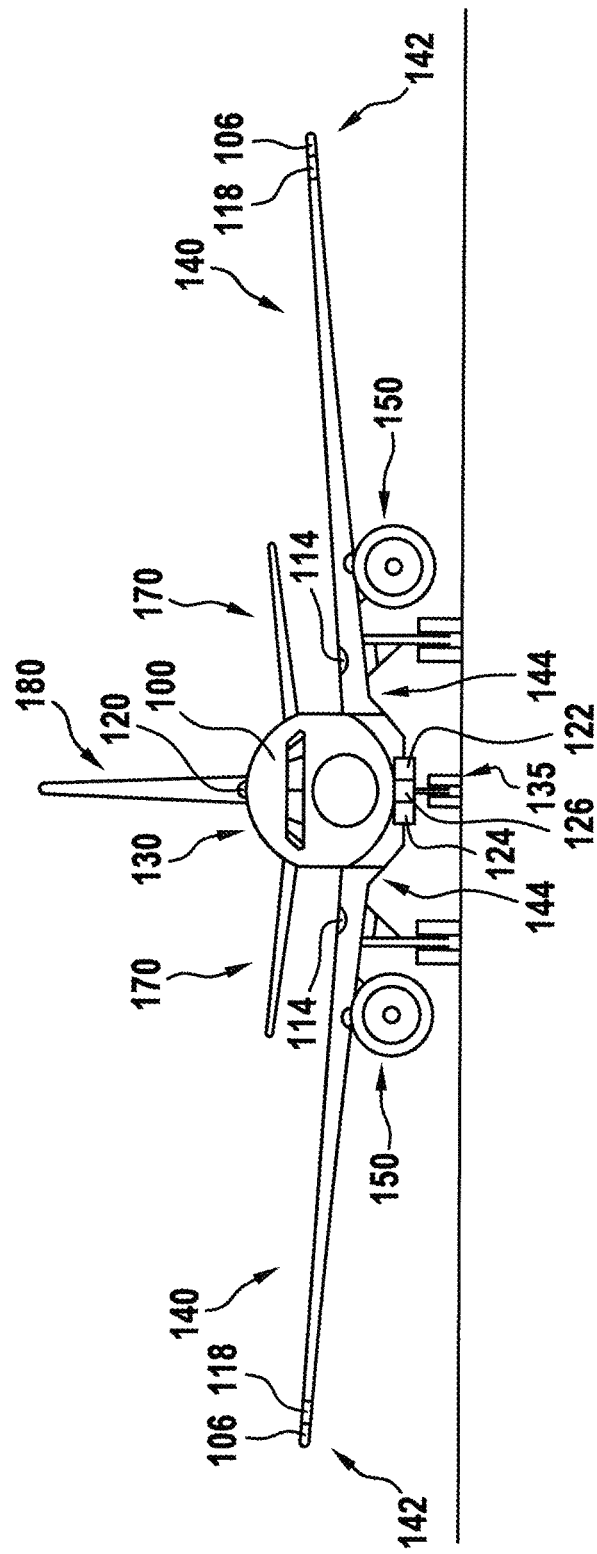
FIG. 1B shows a schematic front view of the aircraft shown in FIG. 1A.

FIGS. 1A and 1B, jointly referred to as FIG. 1 herein, show an aircraft 100, in particular an airplane, comprising a fuselage 130, which houses a cockpit 202 and a passenger cabin 204, and two wings 140, extending from the fuselage 130. Two horizontal stabilizers 170 and a vertical stabilizer 180 extend from a rear portion of the fuselage 130. An engine 150 is mounted to each of the wings 140, respectively. The aircraft 100 is shown in a top view in FIG. 1A and shown in a front view in FIG. 1B.

The aircraft 100 of FIG. 1 is equipped with a wide variety of exterior lights. In particular, the aircraft 100 is equipped with three navigation lights 106, two logo lights 108, two wing scan lights 110, two engine scan lights 112, two runway turn-off lights 114, two cargo loading lights 116, three white anti-collision strobe lights 118, two red-flashing anti-collision beacon lights 120, a landing light 122, a take-off light 124, and a taxi light 126. It is pointed out that these kinds of lights and their numbers are exemplary only and that the aircraft 100 may be equipped with additional lights that are not shown.

The three navigation lights 106 are positioned in the left and right wing tips 142 as well as at the tail 160 of the aircraft 100. In normal flight conditions, each one of the navigation lights 106 emits light in one of the colors green, red and white, thus indicating to the aircraft environment if they are looking at the port side, starboard side or tail side of the aircraft. The navigation lights 106 are normally on during all phases of the flight and in all flight conditions.

The logo lights 108 are directed to the vertical stabilizer 180 of the aircraft 100 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144 of the wings 140 of the aircraft 100. The wing scan lights 110 and the engine scan lights 112 are normally off during the flight and may be switched on periodically or upon reasonable cause by the pilots or by the aircrew, in order to check the wings 140 and the engines 150 of the aircraft 100.

The runway turn-off lights 114 are positioned in the roots 144 of the wings 140. The runway turn-off lights 114 are directed forwards and are normally switched off during the flight and switched on during taxiing, at least at night.

The cargo loading lights 116 are positioned on the left and right sides of the fuselage 130, behind the wings 140 and in front of the tail structure of the aircraft 100. They are normally switched off during the flight of the aircraft 100.

The white anti-collision strobe lights 118 are positioned in the left and right wing tips 142 as well as at the tail 160 of the aircraft 100. The white anti-collision strobe lights 118 emit respective sequences of white light flashes during normal operation of the aircraft 100. It is also possible that the white anti-collision strobe lights 118 are only operated during night and in bad weather conditions.

The red-flashing anti-collision beacon lights 120 are positioned on the top and the bottom of the fuselage 130 of the aircraft 100. They are arranged at the height of the wings in the longitudinal direction of the aircraft 100. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1A. The red-flashing anti-collision beacon lights 120 are normally switched on during taxiing and during take-off and landing. Their output is perceived as a sequence of red light flashes in a given viewing direction.

In the embodiment depicted in FIGS. 1A and 1B, the runway turn-off lights 114 are located in the wings 140, in particular in the roots 144 of the wings 140, and the landing light 122, the take-off light 124 and the taxi light 126 are mounted to the front gear 135 of the aircraft 100. The front gear 135 is stored within the fuselage 130 of the aircraft 100 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140, in particular in the roots 144 of the wings 140, of the aircraft 100.

The aircraft 100 may also comprise one or more multi-functional lights, which combine(s) the functionalities of at least two of a landing light, a take-off light, a taxi light, a runway turn-off light, a navigation light, a white strobe anti-collision light, and a red-flashing beacon light.

Since the landing light 122, the take-off light 124, and the taxi light 126 are arranged on the bottom of the aircraft 100, they are also depicted in phantom in FIG. 1A.

Each of these exterior aircraft lights may be an aircraft light according to an exemplary embodiment of the invention.

Figure 2:
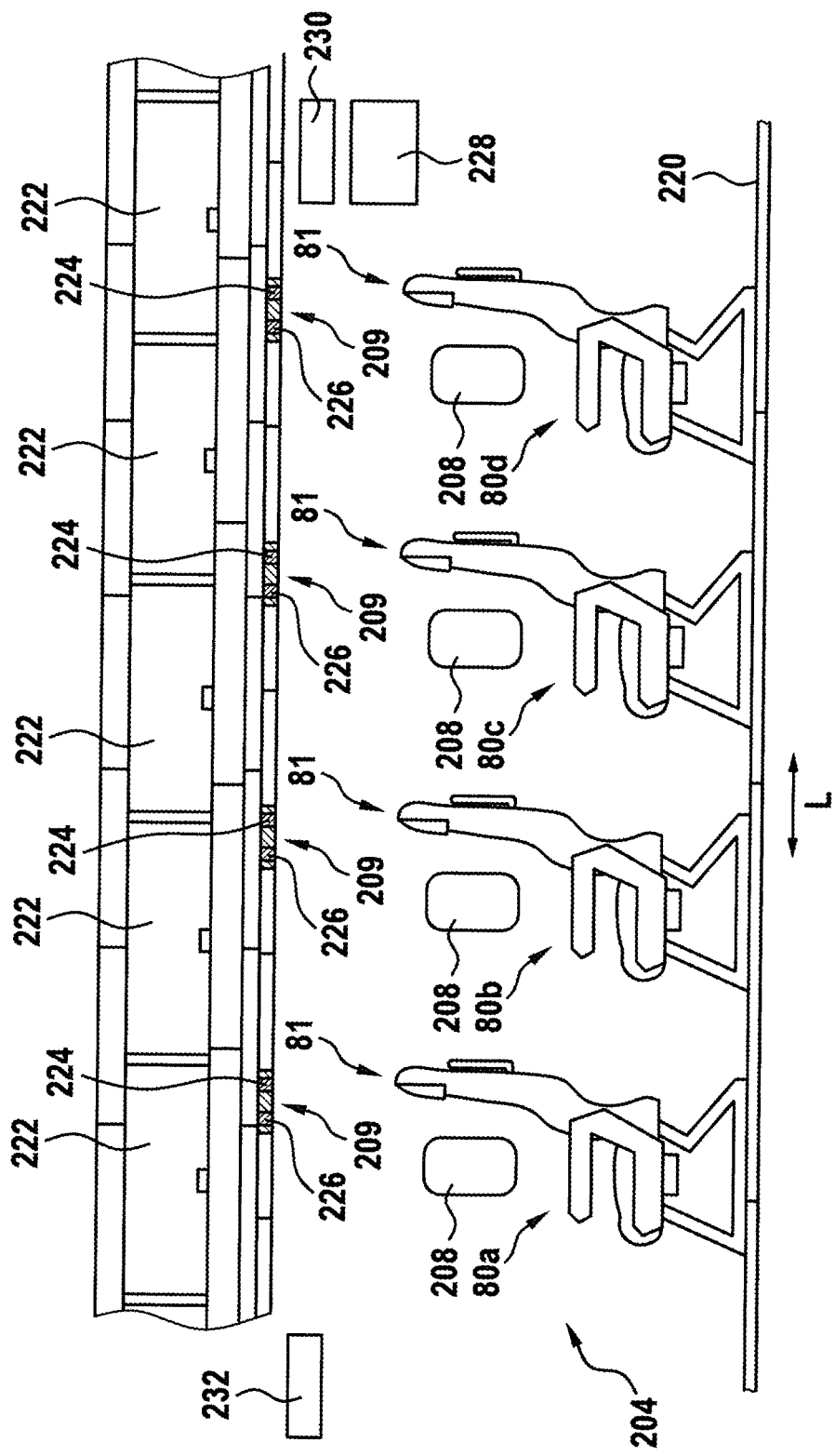
FIG. 2 shows a schematic longitudinal cross-sectional view of a section of the passenger cabin of the aircraft shown in FIGS. 1A and 1B.

FIG. 2 shows a schematic longitudinal cross-sectional view of a section of the passenger cabin 204 of the aircraft 100 shown in FIG. 1.

Four seats 81, which are also referred to as passenger seats 81, are visible in FIG. 2. The passenger seats 81 are mounted to a floor 220 of the passenger cabin 204. Each of the depicted passenger seats 81 belongs to a different seat row 80a-80d. The seat rows 80a-80d are spaced apart from each other along the longitudinal direction L of the passenger cabin 204.

For each of the seat rows 80a-80d, a window 208 is provided, which allows the passengers to view the outside of the aircraft 100. Further, a plurality of overhead baggage compartments 222, which provide storage space for the passengers' baggage, are provided above the passenger seats 81.

Each seat row 80a-80d may include a plurality of passenger seats 81, for example three passenger seats 81, which are arranged next to each other along a lateral direction, which is orthogonal to the longitudinal direction L. The additional passenger seats, i.e. the middle seat and the window seat, of each seat row 80a-80d are not visible in FIG. 2, as they are arranged behind and therefore hidden by the depicted aisle seats 81.

An aircraft overhead passenger service unit (PSU) 209 is provided above each of the seat rows 80a-80d, respectively.

Each of the aircraft overhead passenger service units 209 may comprise at least one interior aircraft light. Each of the aircraft overhead passenger service units 209 may, for example, comprise a plurality of passenger reading lights 224, wherein the light output of each of the passenger reading lights 224 is directed towards one of the passenger seats 81 arranged below the respective aircraft overhead passenger service unit 209. Each of the aircraft overhead passenger service units 209 may further comprise one or more signal lights 226, which may, for example, light up in case a request for the cabin service personnel has been triggered by a passenger or in case a passenger instruction, such as a fasten your seat belt symbol, is depicted to the passenger.

The passenger cabin 204 may further comprise at least one general cabin illumination light 228 for illuminating the passenger cabin 204, at least one emergency light 230 for providing illumination in an emergency situation, and/or at least one exit light 232 for indicating an emergency exit location and/or for illuminating an exit path out of the aircraft.

Each of these interior aircraft lights may be an aircraft light according to an exemplary embodiment of the invention.

Figure 3A:
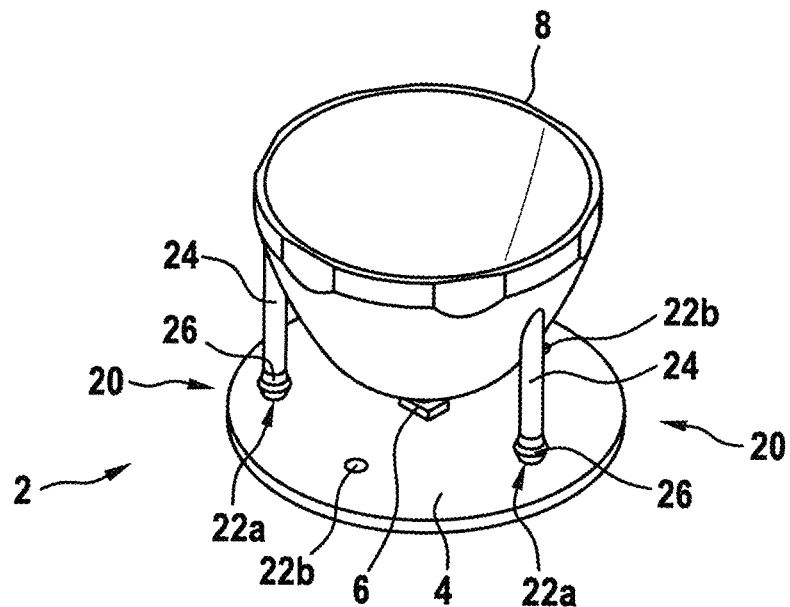
FIG. 3A shows an aircraft light according to an exemplary embodiment of the invention in a perspective view.

FIG. 3A shows an aircraft light 2 according to an exemplary embodiment of the invention in a perspective view. The aircraft light 2 comprises a reflector 8 and an optics support system 20. The optics support system 20 includes a support board 4 and an LED 6, which is mounted to the support board 4.

In the perspective view of FIG. 3A, the support board 4 is shown as having a disc shape, with the LED 6 being arranged at the center of said disc. It is understood that the support board 4 may have different shapes and may be more extensive than shown in FIG. 3A. It is also understood that the support board 4 may support more than the depicted components of the aircraft light 2.

The reflector 8 is arranged over the LED 6. The reflector 8 has rotational symmetry with respect to a central axis, which extends through the LED 6 and which is oriented perpendicular to the support board 4.

The reflector 8 has a cut-out portion facing towards the support board 4. At least a portion of the light, emitted by the LED 6, enters the reflector 8 through the cut-out portion and is reflected by the reflector 8. In the exemplary embodiment of FIG. 3A, the reflector 8 has a substantially parabolic shape. A portion of the light, as emitted by the LED 6, is reflected by the reflector 8 and is collimated by the reflector 8, due to its parabolic shape. The reflected portion of the light may be emitted in a main light emission direction, substantially perpendicular to the support board 4. It is understood that the reflector 8 may have different geometries and/or set-ups with respect to the LED 6. The reflector 8 is an optical element that is arranged over the LED 6 and that conditions the light output of the LED 6. It is further understood that, in addition or as an alternative to the reflector 8, a lens, such as a collimating lens, may be provided. For example, an additional collimating lens may be provided within the reflector 8, collimating that portion of the light of the LED 6 that enters into the reflector 8 and that is not reflected by the reflector 8. In this way, a collimating reflector lens combination may be provided.

The reflector 8 comprises three legs 24 for supporting the reflector 8 on the support board 4. Each of the legs 24 has an engagement portion 26 at its support board facing end.

Three corresponding first leg stands 22a are formed within the support board 4 for receiving the engagement portions 26 of the three legs 24. Further, three corresponding second leg stands 22b are formed within the support board 4 for receiving the engagement portions 26. The legs 24 may be selectively placed on the first leg stands 22a or the second leg stands 22b. Details of said selective placement/engagement will be described below.

While there are three pairs of engaged leg stands 22a and legs 24, only two of the those pairs are visible in FIG. 3A, because one of the pairs is blocked from view by the reflector 8. Via the coupling provided by the leg stands 22a and the legs 24, the reflector 8 assumes its intended position with respect to the support board 4 and, thus, with respect to the LED 6.

The support board 4 may be a printed circuit board (PCB), in particular a multi-layer support board 4 comprising multiple layers. The support board 4 may have further electric components integrated into the support board 4, such as conductors to the LED 6, which are not shown in FIG. 3A. Also, the support board 4 may support further electric components, such as power terminals for connection to an external power source, such as drive circuitry for the LED 6, etc., which are not shown in FIG. 3A.

The aircraft light 2 may comprise further components that are not depicted in FIG. 3A for clarity of illustration. For example, the aircraft light 2 may have a light transmissive shield, such as a light transmissive lens cover, in order to protect the depicted components from adverse environmental influences. The lens cover may have a dome shape and may be arranged over the LED 6 and the reflector 8. It is also possible that the lens cover is a substantially planar shield that is arranged substantially parallel to the support board 4. With such protective structure, the aircraft light 2 may be conveniently placed in the interior of an aircraft, with the protective structure preventing passenger interference with the components of the aircraft light 2, or may be conveniently placed on the exterior of an aircraft, with the protective structure shielding the components of the aircraft light 2 from environmental influences, such as particle impact, aerodynamic drag, potentially corroding exhaust gases, humidity and ice build-up on the components, etc.

Figure 3B:
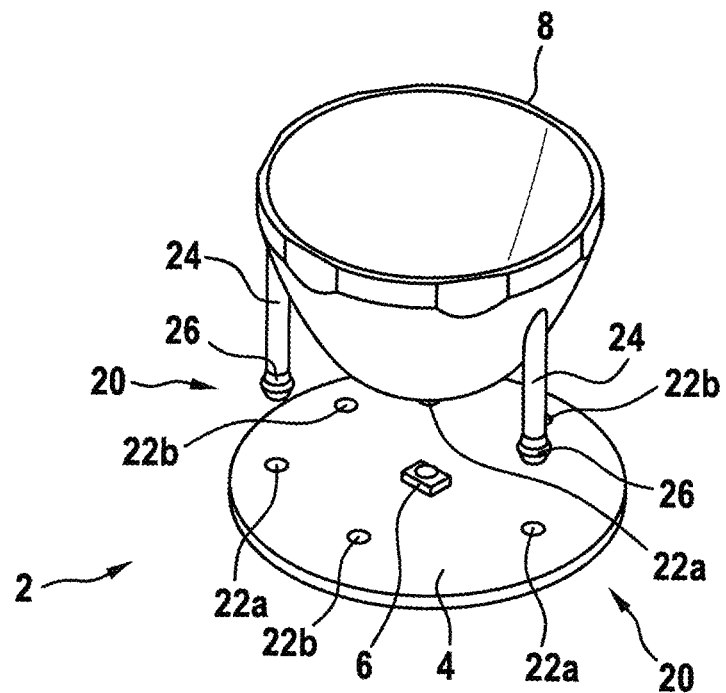
FIG. 3B shows the aircraft light of FIG. 3A in a partially assembled state.

FIG. 3B shows the aircraft light 2 of FIG. 3A in a partially assembled state. In particular, FIG. 3B shows the reflector 8 and its legs 24 separated from the support board 4.

Each of the legs 24 comprises a substantially spherical engagement portion 26. During assembly of the aircraft light 2, the spherical engagement portions 26 are set into the leg stands 22a, defining the position of the reflector 8 with respect to the support board 4. As a result, the position of the reflector 8 with respect to the LED 6, in particular including the height of the reflector 8 with respect to the LED 6, is defined by the leg stands 22a as well. Instead of the spherical engagement portions 26, the legs 24 may also have substantially flat engagement portions at their lower ends, which may be placed on the support board 4. For both the spherical engagement portions 26 and the flat engagement portions, engagement pins may be provided on the lower ends of the legs 24. The engagement pins may protrude towards and, potentially, into the support board 4. An example of flat engagement portions with protruding engagement pins will be described below with respect to FIGS. 5A to 5D.

Turning back to FIGS. 3A and 3B, the three pairs of leg stands 22a and legs 24 are arranged around the LED 6. In particular, the leg stands 22a and legs 24 are substantially equally spaced from the LED 6 and are distributed around the circumference of the reflector 8. In this way, a highly stable mechanical engagement between the support board 4 and the reflector 8 may be achieved. Also, the second leg stands 22b are arranged around the LED 6.

Depending on the type of the LED 6, which is provided on the support board 4, it may be desired to arrange the reflector 8 in different heights above the support board 4 for arranging the LED 6 in the focal point of the reflector 8.

In order to allow the aircraft light 2 to be employed with different types of LEDs, it would be beneficial if the same reflector 8 could be arranged at different heights above the same support board 4, without the need for modifying the reflector 8 and/or the support board 4.

This may be achieved by providing different sets of leg stands on the support board 4. In the exemplary embodiments of FIGS. 3A and 3B, the first set of leg stands 22a and the second set of leg stands 22b are a particular implementation of such different sets of leg stands. Generally, according to an exemplary embodiment of the invention, at least two sets of leg stands are provided on the support board 4, in order to allow for arranging the reflector 8 at different heights above the support board 4 by selectively coupling the engagement portions 26 of the legs 24 with a particular one of the different sets of leg stands.

Figure 4:
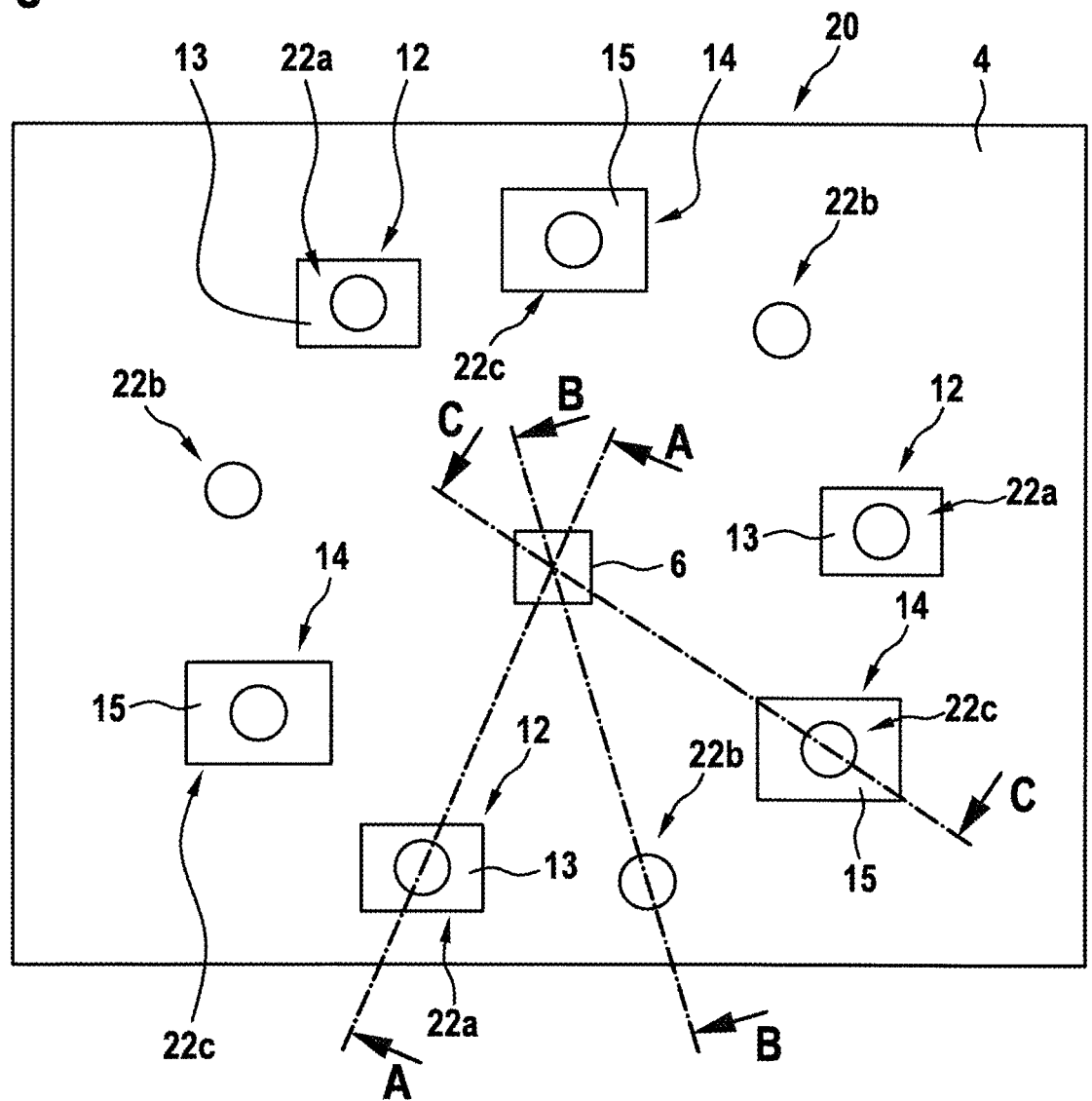
FIG. 4 depicts a plan view of a portion of an optics support system according to an exemplary embodiment of the invention, which may be used in an aircraft light according to an exemplary embodiment of the invention.

FIG. 4 depicts a plan view of a portion of an optics support system 20 according to an exemplary embodiment of the invention. The optics support system 20 may be employed in an aircraft light according to an exemplary embodiment of the invention.

The optics support system 20 comprises a support board 4 and an LED 6, which is mounted to the support board. The LED 6 is located in the center of the portion of the support board 4, depicted in FIG. 4.

In the exemplary embodiment depicted in FIG. 4, nine leg stands 22a, 22b, 22c are arranged around the LED 6. The leg stands 22a, 22b, 22c are in particular positioned along a circular contour, which is centered at the LED 6.

The nine leg stands 22a, 22b, 22c a provided as three groups of leg stands 22a, 22b, 22c, with each group of leg stand 22a, 22b, 22c comprising three leg stands 22a, 22b, 22c, which are arranged at angular distances of 120° with respect to each other. The individual leg stands of the three groups of leg stands are provided in an alternating manner along the circular contour. The three groups of leg stands 22a, 22b, 22c are also referred to as three sets of legs stands 22a, 22b, 22c.

The three sets of leg stands 22a, 22b, 22c are rotated by 40° with respect to each other around a central axis, extending through the LED 6 perpendicular to the support board 4.

It is understood that the arrangement of the leg stands 22a, 22b, 22c, as depicted in FIG. 4, is only exemplary and that other configurations, comprising more or less then three sets of leg stands 22a, 22b, 22c, are possible as well.

In an embodiment comprising a first set of leg stands and a second set of leg stands, the first and second sets of leg stands may, for example, be arranged in a configuration, which is mirror symmetrical with respect to a line of symmetry extending through the LED in the main plane of extension of the multi-layer support board.

Figure 5A:
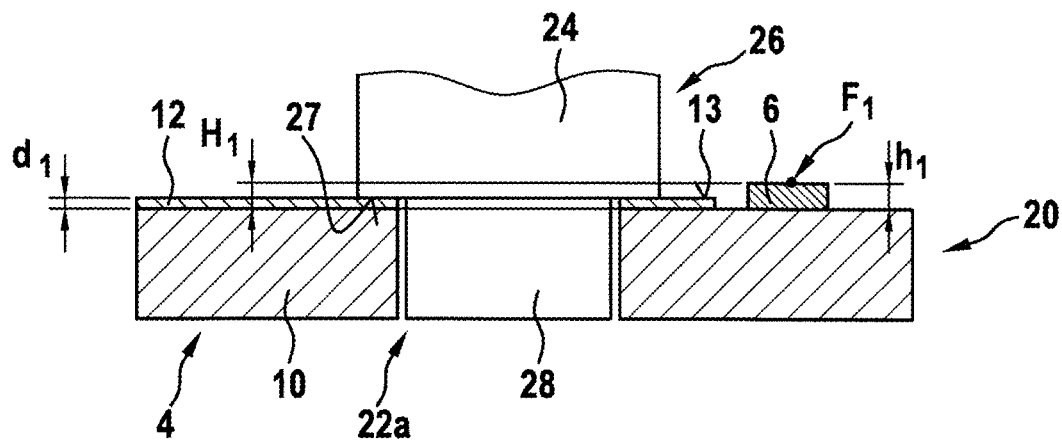
FIG. 5A shows a schematic cross-sectional view of the optics support system of FIG. 4, which is cut along a first line A-A.

FIG. 5A shows a schematic cross-sectional view of the optics support system 20 of FIG. 4, which is cut along line A-A depicted in FIG. 4.

Line A-A extends through the LED 6 and one of the leg stands 22a of a first set of leg stands 22a.

The optics support system 20 comprises a multi-layer support board 4, including a support board core layer 10, such as an FR4 layer. The LED 6 may be arranged directly on the support board core layer 10.

In order to allow the aircraft light 2 to emit an optimized light output, the focal point of the reflector 8 is to be positioned at a position $F_1$, which is defined by the characteristics of the LED 6. The focal point of the reflector 8 is in particular to be positioned at the position of the LED 6 from which the main portion of the light is emitted.

A leg stand 22a of the first set of leg stands 22a is shown to the left of the LED 6 in FIG. 5A. The first set of leg stands 22a comprises two additional leg stands 22a, which are not shown in FIG. 5A.

The depicted leg stand 22a includes an opening, which is formed within the support board 4, in particular within the support board core layer 10, for receiving an engagement pin 28 of the engagement portion 26 of one of the legs 24 of the optical element 8.

The leg 24 has a larger cross-section, in particular a larger diameter, than the engagement pin 28 and the opening, which is formed within the support board 4. In consequence, the leg 24 is not able to enter into the opening.

As a result, the vertical position of the leg 24 and, in consequence, the vertical position or height of the reflector 8 with respect to the support board 4, is defined by a support surface 27 of the leg 24, which is provided by the end face of the leg 24 around the engagement pin 28 and facing the support board 4.

In the configuration depicted in FIG. 5A, a portion of the support board 4 surrounding the leg stand 22a is covered by an additional layer 12, which is formed on the side of the support board core layer 10 facing the reflector 8. The surface of the additional layer 12 facing the reflector 8 provides a first abutment surface 13, facing and supporting the support surface 27 provided at the leg 24.

The vertical position of the leg 24 and, in consequence, the vertical position of the reflector 8 with respect to the support board 4 depends on the thickness di of the additional layer 12 and on the length of the leg 24. The thickness di of the additional layer 12 and the length of the leg 24 may in particular be set so that the focal point of the reflector 8 is arranged at a first height $H_1$, when the legs 24 of the reflector 8 are in engagement with the leg stands 22a of the first set of leg stands 22, as it is depicted in FIG. 5A.

The thickness di of the additional layer 12 may, for example, be in the range of between 0.1 mm and 0.5 mm, in particular in the range of between 0.15 mm and 0.3 mm.

In the exemplary embodiment of FIG. 5A, the additional layer 12 is a conductive layer, such as a copper layer. Other, non-depicted parts of the conductive layer may be used to provide power to the LED 6 and/or to other components of the aircraft light. The additional layer 12 may also be one of a solder mask layer, a silk screen, and a surface mounted device structure ("SMD" structure).

Figure 5B:
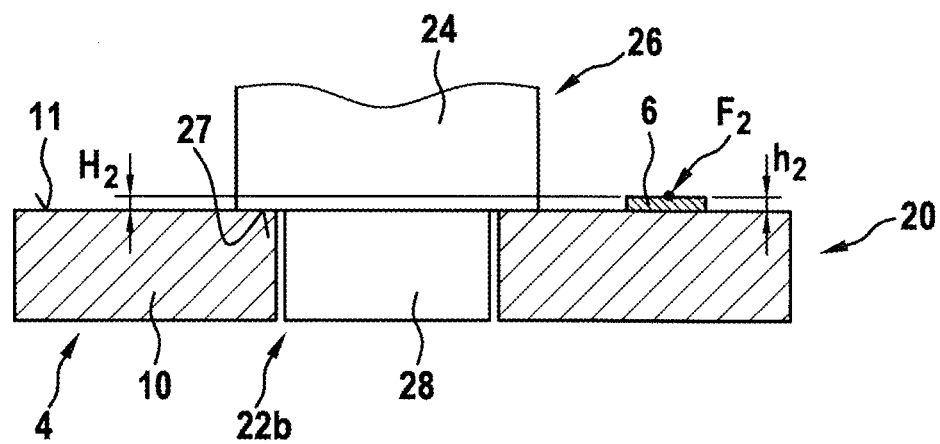
FIG. 5B shows a schematic cross-sectional view of the optics support system of FIG. 4, which is cut along a second line B-B.

FIG. 5B shows a schematic cross-sectional view of the optics support system 20, which is cut along line B-B depicted in FIG. 4.

Line B-B extends through the LED 6 and one of the leg stands 22b of a second set of leg stands 22b.

In the configuration depicted in FIG. 5B, the LED 6 is of a different LED type than the LED 6 depicted in FIG. 5A. In particular, the LED 6 depicted in FIG. 5B has a lower height $h_2$ than the LED 6 depicted in FIG. 5A. In consequence, for providing an optimized light emission, the focal point of the reflector 8 is desired to be arranged at a lower height $H_2$ with respect to the support board 4 than in the configuration depicted in FIG. 5A.

In the configuration depicted FIG. 5B, no additional layer is provided on the side of the support board core layer 10 facing the reflector 8 in the area surrounding the leg stand 22b. Instead, an abutment surface 11, supporting the support surface 27 of the leg 24, is provided by the surface of the support board core layer 10 facing the reflector 8.

When the legs 24 of the same reflector 8 are arranged in the leg stands 22b of the second set of leg stands 22b, as depicted in FIG. 5B, the leg 24 and the reflector 8 are arranged at a lower height $H_2$ with respect to the support board 4 than in the configuration depicted in FIG. 5A. As a result, the focal point of the reflector 8 is located at a lower position $F_2$ as well, in particular at a position which may be adapted to the lower height $h_2$ of the LED 6.

In case the thickness $d_1$ of the additional layer 12, which is provided on the support board core layer 10 in the configuration depicted in FIG. 5A, is in the range of between 0.1 mm and 0.5 mm, in particular in the range of between 0.15 mm and 0.3 mm, the focal point of the reflector 8 may in particular be located at a position $F_2$, which is between 0.1 mm and 0.5 mm, in particular between 0.15 mm and 0.3 mm, below the position Fi of the focal point in the configuration depicted in FIG. 5A.

Figure 5C:
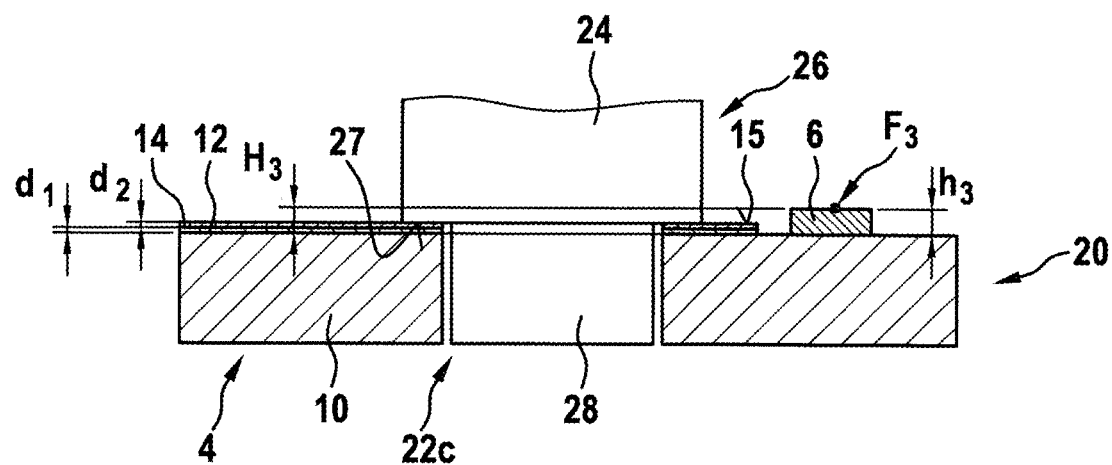
FIG. 5C shows a schematic cross-sectional view of the optics support system of FIG. 4, which is cut along a third line C-C.

FIG. 5C shows a schematic cross-sectional view of the optics support system 20 of FIG. 4, which is cut along line C-C depicted in FIG. 4.

Line C-C extends through the LED 6 and one of the leg stands 22c of a third set of leg stands 22c.

In the configuration depicted in FIG. 5C, the LED 6 is of a different LED type than the LEDs 6 depicted in FIGS. 5A and 5B, respectively. In particular, the LED 6 depicted in FIG. 5C has a larger height $h_3$ than the LED 6 depicted in FIG. 5A. In consequence, for providing an optimized light emission, the focal point of the reflector 8 is desired to be arranged at a larger height $H_3$ with respect to the support board 4.

In the configuration depicted in FIG. 5C, a first additional layer 12 is provided on the side of the support board core layer 10 facing the reflector 8. Further, a second additional layer 14 is provided on the side of the first additional layer 12 facing the reflector 8 in the area of the support board 4 surrounding the leg stand 22c.

When a leg 24 of the reflector 8 is arranged in a leg stand 22c of a third set of leg stands 22c, as it is depicted in FIG. 5C, the support surface 27 of the leg 24 is supported by an abutment surface 15 of the second additional layer 14, so that the leg 24 and the reflector 8 are arranged at a higher position with respect to the support board 4 than in the configuration depicted in FIG. 5A. As a result, the focal point of the reflector 8 is located at a higher position $F_3$ as well, in particular at a position $F_3$, which may be adapted to the larger height $h_3$ of the LED 6.

The thickness $d_1$ of the first additional layer 12, which is provided on the support board core layer 10, may be in the range of between 0.1 mm and 0.5 mm, in particular in the range of between 0.15 mm and 0.3 mm.

The thickness $d_2$ of the second additional layer 14, which is provided on the first additional layer 12 may be in the range of between 0.1 mm and 0.5 mm, in particular by between 0.15 mm and 0.3 mm, as well.

In consequence, the focal point of the reflector 8 may be located at a position $F_3$, which is between 0.1 mm and 0.5 mm, in particular by between 0.15 mm and 0.3 mm above the position $F_1$ of the focal point in the first configuration, which is depicted in FIG. 5A.

When compared to the second configuration depicted in FIG. 5B, the focal point of the reflector 8 may be located at a position $F_3$, which is between 0.2 mm and 1 mm, in particular by between 0.3 mm and 0.6 mm above the position $F_2$ of the focal point in the second configuration.

In the exemplary embodiment of FIG. 5C, the second additional layer 14 is a solder mask layer. The second additional layer may also comprise multiple solder mask layers, such as a first solder mask layer, which is photosensitive, and a second solder mask layer, which may provide UV protection. The second additional layer 14 may also be one of a silk screen and a surface mounted device structure ("SMD" structure).

Figure 5D:
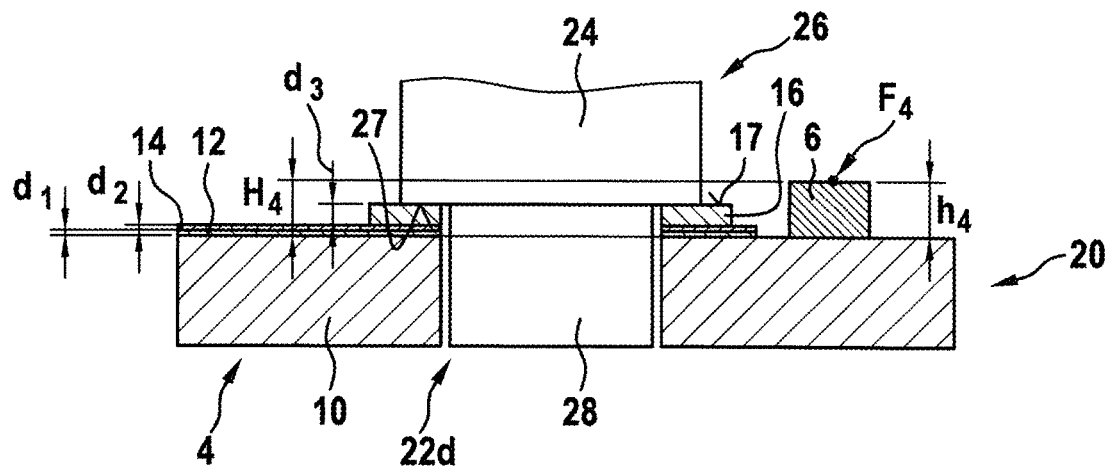
FIG. 5D shows a schematic cross-sectional view of an adapted optics support system, which may also represent a cut along the third line C-C.

FIG. 5D shows a schematic cross-sectional view of an adapted optics support system in accordance with an alternative embodiment of the invention, which may also represent a cut along the position of line C-C, as illustrated in FIG. 4 with respect to the optics support system 20 of FIG. 4.

In the configuration depicted in FIG. 5D, the LED 6 is of yet another LED type than the LEDs 6 depicted in FIGS. 5A, 5B and 5C, respectively. In particular, the LED 6 depicted in FIG. 5D has an even larger height $h_4$ than the LED 6 depicted in FIG. 5C. In consequence, for providing an optimized light emission, the focal point of the reflector 8 is desired to be arranged at an even larger height $H_4$ with respect to the support board 4.

Similar to the configuration depicted in FIG. 5C, a first additional layer 12 is provided on the side of the support board core layer 10 facing the reflector 8, and a second additional layer 14 is provided on the side of the first additional layer 12 facing the reflector 8.

In the configuration depicted FIG. 5D, a third additional layer 16 is additionally provided on the side of the second additional layer 14 facing the reflector 8.

When the legs 24 of the reflector 8 are arranged on the leg stands 22c of a third set of leg stands 22c, as depicted in FIG. 5D, the support surface 27 of the leg 24 is supported by an abutment surface 17 of the third additional layer 16, so that the leg 24 and the reflector 8 are arranged in an even higher position with respect to the support board 4 than in the configuration depicted in FIG. 5C. As a result, the focal point of the reflector 8 is located at a higher position $F_4$ as well, in particular at a position $F_4$ which may be adapted to the larger height $h_4$ of the LED 6.

The thickness $d_1$ of the first additional layer 12, which is provided on the support board core layer 10, may be in the range of between 0.1 mm and 0.5 mm, in particular in the range of between 0.15 mm and 0.3 mm.

The thickness $d_2$ of the second additional layer 14, which is provided on the first additional layer 12, may be in the range of between 0.1 mm and 0.5 mm, in particular in the range of between 0.15 mm and 0.3 mm, as well.

The thickness $d_3$ of the third additional layer 16, which is provided on the first additional layer 12 and the second additional layer 14, may be in the range of between 0.1 mm and 2 mm, in particular in the range of between 0.2 mm and 1 mm.

The first and second additional layers 12, 14 may, for example, have a thickness $d_1$, $d_2$ of 0.2 mm, respectively, and the third additional layer 16 may have a thickness of 0.5 mm, resulting in a stack of layers 12, 14, 16 having a total height $h_4$ of 0.9 mm.

In the exemplary embodiment of FIG. 5D, the third additional layer 16 is a surface mounted device structure ("SMD" structure). For example, the third additional layer 16 may be formed by an SMD resistor. Said SMD resistor may be without a circuit function, but may be readily available during production of the support board. The third additional layer 16 may be a continuous layer/have continuous portions or may consist of discrete SMD elements, which jointly form a distributed SMD structure.

The heights $h_1$, $h_2$, $h_3$, $h_4$ and thicknesses $d_1$, $d_2$, $d_3$, $d_4$, mentioned before with respect to FIGS. 5A to 5D, are exemplary only. They may be adjusted to the heights $H_1$, $H_2$, $H_3$, $H_4$ of the LEDs 6, which may be employed in an aircraft light 2 according to an exemplary embodiment of the invention. Also, the heights $h_1$, $h_2$, $h_3$, $h_4$ and thicknesses $d_1$, $d_2$, $d_3$, $d_4$ may be chosen during a preemptive design of the aircraft light and may represent typical changes in height/chip height of LEDs, as may be expected to happen during the expected development of LEDs over the next years.

Three different sets of leg stands 22a, 22b, 22c are depicted in FIG. 4. It is understood that in different embodiments, which are not explicitly shown in the figures, an optics support system 20 according to an exemplary embodiment of the invention may comprise only two or more than three different sets of leg stands.

The leg stands belonging to the same set of leg stands 22a, 22b 22c may have the same height.

In an alternative configuration, the leg stands 22a, 22b, 22c belonging to the same set of leg stands 22a, 22b, 22c may have the different heights. In such an alternative configuration, the heights of the leg stands may be shifted by a constant amount between the different sets of leg stands 22a, 22b, 22c.

For example: If three leg stands of a first set of leg stands 22a have heights of 0.0 mm, 0.1 mm and 0.2 mm with respect to the support board core layer 10, the three leg stands of a second set of leg stands 22b may have heights of 0.2 mm, 0.3 mm and 0.4 mm with respect to the support board core layer 10, and the three leg stands of a third set of leg stands 22c may have heights of 0.5 mm, 0.6 mm and 0.8 mm with respect to the support board core layer 10, respectively.

In such a configuration, in which the leg stands belonging to the same set of leg stands 22a, 22b, 22c have the different heights, the legs 24 of the reflector 8 may have different lengths for compensating for the different heights of the leg stands.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An optics support system for an aircraft light, comprising:
   a multi-layer support board, having a main plane of extension;
   an LED arranged on the multi-layer support board;
   a first set of leg stands, positioned on a circular contour around the LED, wherein the first set of leg stands provides first abutment surfaces for arranging an optical element, having a corresponding set of legs, over the LED in a first orientation; and
   a second set of leg stands, positioned on the circular contour around the LED, wherein the second set of leg stands provides second abutment surfaces for arranging the optical element over the LED in a second orientation;
   wherein the first abutment surfaces and the second abutment surfaces are at different heights in a z-dimension of the multi-layer support board, orthogonal to the main plane of extension.

2. The optics support system according to claim 1, wherein the first set of leg stands and the second set of leg stands allow for the optical element to be arranged in first and second orientations, which differ with respect to their rotation around a central axis through the LED.

3. The optics support system according to claim 1, wherein each of the first set of leg stands and the second set of leg stands consists of three or four or five leg stands, respectively.

4. The optics support system according to claim 1, wherein each of the first set of leg stands and the second set of legs stands is provided on a respective one of the following components of the multi-layer support board:
   a support board core layer, such as an FR4 layer,
   a conductive layer, such as a copper layer,
   a solder mask layer,
   a silk screen,
   a surface mounted device structure.

5. The optics support system according to claim 1, wherein the first abutment surfaces and the second abutment surfaces differ in height in the z-dimension of the multi-layer support board by between 0.1 mm and 1 mm, in particular by between 0.15 mm and 0.3 mm.

6. The optics support system according to claim 1, further comprising:
   a third set of leg stands, positioned around the LED, wherein the third set of leg stands provides third abutment surfaces for arranging the optical element over the LED in a third orientation;
   wherein the first abutment surfaces and the second abutment surfaces and the third abutment surfaces are at different heights in the z-dimension of the multi-layer support board.

7. The optics support system according to claim 6, wherein the first set of leg stands and the second set of leg stands and the third set of leg stands are positioned on a circular contour around the LED.

8. The optics support system according to claim 6, wherein the first set of leg stands and the second set of leg stands and the third set of leg stands allow for the optical element to be arranged in first, second, and third orientations, which differ with respect to their rotation around a central axis through the LED.

9. The optics support system according to claim 6, wherein each of the first set of leg stands and the second set of leg stands stands and the third set of leg stands is provided on a respective one of the following components of the multi-layer support board:
   a support board core layer, such as an FR4 layer,
   a conductive layer, such as a copper layer,
   a solder mask layer,
   a silk screen,
   a surface mounted device structure;
   wherein the first set of leg stands, the second set of leg stands, and the third set of leg stands are in particular provided on the support board core layer, on the conductive layer, and on the solder mask layer, respectively.

10. An aircraft light, comprising:
    an optics support system according to claim 1; and
    an optical element, arranged over the LED;
    wherein the optical element has a set of legs and wherein the set of legs of the optical element is in engagement with a particular one of the first set of leg stands and the second set of leg stands of the optics support system.

11. The aircraft light according to claim 10,
    wherein the optical element is a reflector, in particular a collimating reflector, or a lens, in particular a collimating lens, or a reflector lens combination, in particular a collimating reflector lens combination; and/or wherein the optical element is a substantially rotationally symmetric optical element.

12. The aircraft light according to claim 10, wherein the aircraft light is an exterior aircraft light, such as an aircraft navigation light or a white strobe anti-collision light or a red-flashing aircraft beacon light or a logo light or a wing scan light or an engine scan light or a cargo loading light or an aircraft headlight, for example an aircraft landing light or an aircraft take-off light or an aircraft taxi light or an aircraft runway turn-off light, or a multi-functional exterior aircraft light, having the functionalities of at least two of an aircraft navigation light, a white strobe anti-collision light, a red-flashing aircraft beacon light, a logo light, a wing scan light, an engine scan light, a cargo loading light, an aircraft landing light, an aircraft take-off light, an aircraft taxi light, and an aircraft runway turn-off light; or wherein the aircraft light is an interior aircraft light, such as a general cabin illumination light, a signal light, a passenger reading light, a washroom illumination light, an emergency light, or an exit light.

13. An aircraft, such as an airplane or a helicopter, comprising at least one aircraft light according to claim 10.

14. A method of assembling an aircraft light, the method comprising:

providing a multi-layer support board, having a main plane of extension, wherein the multi-layer support board has a first set of leg stands, positioned around an LED location, and a second set of leg stands, positioned around the LED location, wherein the first set of leg stands provides first abutment surfaces and wherein the second set of leg stands provides second abutment surfaces, wherein the first abutment surfaces and the second abutment surfaces are at different heights in a z-dimension of the multi-layer support board, orthogonal to the main plane of extension;

placing an LED on the LED location, the LED being of a particular LED type with a particular LED chip height in the z-dimension;

depending on the particular LED type of the LED, selecting one of the first set of leg stands and the second set of leg stands;

placing an optical element, having a set of legs, over the LED, with the set of legs being placed on the abutment surfaces of the selected one of the first set of leg stands and the second set of leg stands, wherein the first set of leg stands and the second set of leg stands are positioned on a circular contour.

* * * * *